United States Patent

[11] 3,588,000

| | | |
|---|---|---|
| [72] | Inventors | Arthur G. Buckingham<br>Baltimore;<br>James A. Miller, Linthicum Heights;<br>George Shapiro, Annapolis, Md. |
| [21] | Appl. No. | 748,459 |
| [22] | Filed | July 29, 1968 |
| [45] | Patented | June 28, 1971 |
| [73] | Assignee | Westinghouse Electric Corporation<br>Pittsburgh, Pa. |

[54] ORBIT POSITION CONTROL OF PLANAR REFLECTOR SATELLITES
3 Claims, 2 Drawing Figs.

[52] U.S. Cl.......................................... 244/1,
250/88
[51] Int. Cl....................................... B64g 1/00
[50] Field of Search............................. 244/1,
(ISS), (STAR), (Sci.Lib); 250/88, (Inquired)

[56] References Cited
UNITED STATES PATENTS
3,386,686  6/1968  Phillips........................ 244/1

OTHER REFERENCES
"Fifth National Conference on the Peaceful Uses of Space" NASA SP-82 Page 75

Primary Examiner—Trygve M. Blix
Assistant Examiner—Jeffrey L. Forman
Attorneys—F. H. Henson, E. P. Klipfel and D. F. Straitiff ABSTRACT: Controlling the orbit position of a planar-reflector satellite orbiting a planet such as the earth and having commandable pitch and roll attitude changing means for aiming such satellite to reflect energy from the sun to a desired area on the planet's surface. By suitable command of the pitch and roll attitude changing means during nonfunctional portions of each orbit cycle the planar reflector is orientated relative to the sun for controlling the net effect of solar pressure thereon per orbit to accelerate, decelerate, or maintain average velocity of the satellite, hence control orbital period and the position of the satellite at corresponding times during successive orbits.

ORBIT POSITION CONTROL OF PLANAR REFLECTOR SATELLITES

CROSS REFERENCE TO RELATED APPLICATIONS

U.S. Pat. application, Ser. No. 612,905 (Case 37,786) filed Jan. 31, 1967 by Arthur G. Buckingham discloses a planar-reflector controlled-attitude satellite system for aiming reflected solar energy toward a desired area on the earth during each orbital period of the satellite;

U.S. Pat. application, Ser. No. 637,419 (Case 37,772) filed May 10, 1967 by Arthur G. Buckingham and Frank C. Rushing discloses an embodiment of a space-erectable reflector satellite construction suitable for use in the above reflector satellite system; and U.S. Pat. application, Ser. No. 669,548 (Case 37,787) filed Sept. 21, 1967 by Arthur G. Buckingham, discloses a commandable gravity gradient attitude control apparatus suitable for use in controlling the attitude of at least certain sizes of planar reflector satellites in accord with requirements of the present invention.

BACKGROUND OF THE INVENTION

1. Field of the Invention

Attitude-controlled solar-energy-aiming reflector satellites.

2. Description of the Prior Art

It has been proposed to aim reflected solar energy from attitude-controlled orbiting planar reflector satellites toward desired areas of the earth or other planet of the sun about which such satellites are in orbit, for purposes of illumination, heating etc. for example. Presuming effectuation of such proposal, it becomes desirable to control the average per orbit velocity of such satellites along their orbital paths in order to change their positions at corresponding times during successive orbits and/or spacing between a number of such satellites in the same general orbital path.

SUMMARY OF THE INVENTION

By controlling orientation of the commandable-attitude planar reflector satellite relative to the sun during nonearth-aimed portions of each orbit period, its average per orbit velocity can be changed or maintained by the resultant solar pressure regulation to obtain the desired orbit position control of the satellite without requiring the storage of propulsion energy aboard the satellite and by the mere extension of the functional capability of the commandable-attitude changing means required for the satellite's functional mode of operation in aiming reflected solar energy toward a selected site.

DESCRIPTION OF THE PREFERRED EMBODIMENT

Figure 1:
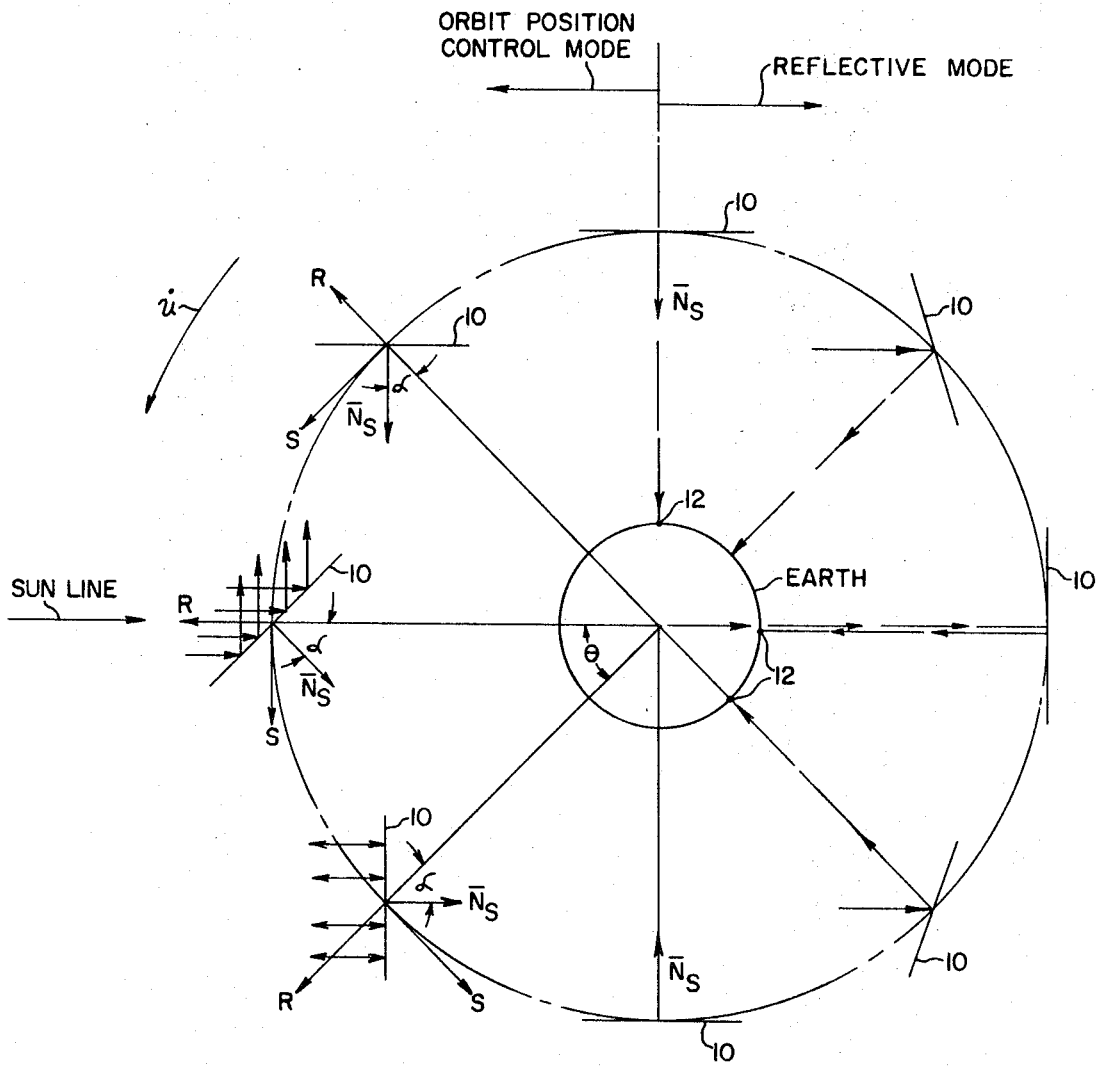
FIG. 1 represents schematically a planar reflector satellite in synchronous orbit around the earth, controlled in attitude per orbit to reflect solar energy toward a selected area on earth during a 12-hour nighttime period and to be subjected to orbit-period-controlling solar pressure forces during the following 12-hour period.

Referring to the drawing, the invention relates to a planar reflector satellite 10 essentially in form of a large flat single-surfaced mirror such as disclosed in aforementioned U.S. application Ser. No. 637,419, and which may be disc-shaped and hundreds of feet in diameter. In accord with the aforementioned U.S. Pat. application Ser. No. 612,905, the planar reflector satellite 10 is exemplified in a synchronous orbit about the earth's equator and indicated symbolically in FIGS. 1 and 2 as a straight line representative of a simplified edgewise view of its flat mirror surface without regard to its actual roll attitude requisite to compensate for declination of the sun with respect to the earth's equator and to aim reflected solar energy to a selected site north or south of the equator. In accord with such patent application, the attitude of the reflector 10 is controlled in pitch and roll responsively to command signals from a ground station to aim reflected solar energy toward a selected area 12 on earth during a portion of each orbital period, such as during a 12 hour nighttime portion of a synchronous orbit period as exemplified in the drawing, for nighttime illumination of such selected area, for example. The pitch angle attitudes of the synchronously-orbiting reflector 10 during such reflective mode directing sunlight to a vertically aligned area 12 on earth may vary within ±45° limit positions at the beginning and end of a reflective mode of attitude control for the reflector satellite 10 and the accelerating effect of solar pressure forces acting on such reflector while receding away from the sun for the first 90° of orbit angle balances the decelerating effect of such solar pressure while moving toward the sun during the following 90° of orbit angle in the illustrated example. A different reflective mode might be chosen, however, in which such solar pressure forces might not be so balanced, as in a case where the reflector 10 might be aimed earthward for unequal sun-advancing and retracting times during the orbital period. Also, in accord with the teachings in Pat. application Ser. No. 612,905 the reflector satellite 10 need not be in synchronous orbit, but may be at a lower-altitude nonsynchronous equatorial or other orbit for increased intensity of nighttime illumination of the selected earth area 12 for a given reflector size.

In accord with the present invention, the orbit position of the reflector 10 relative to the earth at corresponding times per orbit, or, in other words, the orbit period or average per orbit velocity, is regulated as desired by orientating such reflector relative to the sun during the portion of the orbit period in which the reflector 10 is angulated to aim sunlight earthward toward the selected site 12. When employed for illumination, for example, during the nighttime portion of each orbit the reflector 10 may be operated in its reflective mode when desired to aim sunlight earthward toward site 12, and during the daytime portion of each orbit it will be operated in the orbit position control mode; as exemplified in the drawing where reflector satellite 10 in a synchronous orbit about the earth aims sunlight earthward up to 180° of each orbit during a 12-hour nighttime period and is orientated toward the sun for per orbit acceleration during the following 180° daytime portion of each orbit. The pitch attitude changing requirements for such exemplified modes is indicated in the drawing; it being understood that roll attitude control of the reflector 10 satellite also is required, but omitted from the showings herein in behalf of simplification. In accord with the invention, the same attitude changing and control system employed for operation of the reflector 10 in its earthward reflective mode is employed for its orbit position control mode.

The reflector satellites 10 of the present invention will have a relatively large area-to-mass ratio which makes the orbit position control by solar pressure feasible. By way of further analysis with respect to FIG. 1, in the reflective mode, the altitude control equipment will be made capable of tilting the plane of the reflector 10 in shape of a disc, for example, such that a vector, $\bar{N}_s$, normal to the plane of the disc is rotated away from the center of the earth.

If then the direction of motion of the satellite is as shown in the drawing, energy can be added to the orbit by the orientation scheme of the present invention during the nonreflective mode portion of the orbital period, an orbit position control mode portion. In such control mode portion, for example, to obtain acceleration of the reflector 10 it may be angulated during the first half of such portion to assume a pitch attitude in which its normal vector $\bar{N}_s$ is at an angle, $\alpha$, of 45° with respect to a radius vector R projected from the earth's center to the reflector 10 and merely maintained at such angle during the second half of such control mode portion, to present less projected area of the planar reflector 10 to the sun during its travel toward the sun than is presented during its travel away from the sun thereby to obtain a net accelerating force during such a control mode portion of the orbital period. As exemplified in the drawing, midway of the first half of the control mode period, only the edge of the planar reflector 10 is exposed to the sun, and solar pressure force will be substantially nil, while midway of the second half of such control mode period the planar reflector 10 is perpendicular to the sun and solar pressure thereon will be at a maximum. Thus more energy will be added to the reflector 10 during such sun-receding orbital travel than during such sun-advancing travel. Similarly, a net decrease in the energy of the orbit can be obtained by reversing the direction of pitch angulation of the planar reflector 10.

To prove the feasibility of this scheme and to illustrate the magnitude of orbit position control available, following sample calculations are given for the case illustrated in the drawing at a synchronous altitude. The coordinate system shown is used with reference to the calculations. In the system the R axis is coincident with the earth radius vector to the satellite and the S axis is perpendicular in the plane of the orbit and lying along the direction of motion of the satellite. The angle $\theta$ is defined as the angle between the sun line vector and the R axis and the angle $\alpha$ is defined as the angle between the reflector normal vector, $\overline{N}_S$, and the R axis. Both angles are defined as positive counterclockwise. The force on an area element of the satellite is known to be:

$$\overline{dF} = \dot{dm}_1 \overline{V}_1 - \dot{dm}_2 \overline{V}_2 \quad (1)$$

where $\dot{dm}_1$ and $\dot{dm}_2$ are mass rates of photons incident upon and reflected from the satellite, respectively, and $\overline{V}_1$ and $\overline{V}_2$ are the velocity vectors of the incident and reflected photons, respectively. In the defined coordinate system these are:

$$\dot{dm}_1 = \rho \, CdA \cos(\theta + \alpha) \quad (2)$$

$$\dot{dm}_2 = r_S \, \rho \, CdA \cos(\theta + \alpha) \quad (3)$$

$$\overline{V}_1 = -\cos\theta \, \overline{i}_R + \sin\theta \, \overline{i}_S \quad (4)$$

$$\overline{V}_2 = -\theta - 2\alpha)) \, i_R + \sin(-\theta - 2\alpha) \, \overline{i}_S \quad (5)$$

where $\rho$ is the mass density of photons, C is the speed of light, $dA$ is the area element, and $r_S$ is the solar reflectivity of the reflector. A specular reflecting surface has been assumed for the satellite for purposes of deriving the reflected velocity vector. The values of $\rho$ and C are:

$$\rho = 1.002 \times 1025 \text{ slugs/ft.}^3$$

$$C = 299792.5 \text{ km./sec.}$$

The rate of change of the semimajor axis, of an orbit is known to be:

$$\frac{da}{d\theta} = \frac{2}{n^2 m} F_s \quad (6)$$

where $n$ is the mean angular motion of the satellite, $m$ is the satellite mass, and $F_S$ is the component of perturbing force in the S direction. Under the satellite orientation scheme shown in the drawing the angle $\alpha$ must have the following control function:

$$\alpha = -(\pi/2 + \theta) \text{ when } \frac{\pi}{2} \leq \theta \leq -\pi/4 \quad (7)$$

$$\alpha = -\pi/4, \text{ when } -\frac{\pi}{4} < \theta < \pi/4 \quad (8)$$

$$\alpha = \theta - \pi/2, \text{ when } \pi/4 \leq \theta \leq \pi/2 \quad (9)$$

Combining equations (7), (8), (9), with (2), (3), (4), (5) and substituting into equation (1) the following relationships are obtained for the component of force in the S direction:

$$F_s = 0 \text{ when } -\pi/2 \leq \theta \leq -\frac{\pi}{4} \quad (10)$$

$$F_s = \rho C^2 A \cos\left(\theta - \frac{\pi}{4}\right)(\sin\theta - r_s \cos\theta)$$

when $\quad -\frac{\pi}{4} < \theta < \frac{\pi}{4} \quad (11)$ $$F_s = \rho C^2 A \sin 2\theta (\sin\theta - r_s \sin 3\theta)$$

when $\quad \pi/4 \leq \theta \leq \pi/2 \quad (12)$

Thus the change in semimajors axis which can be obtained over one orbit (one day of synchronous altitude) is:

$$\Delta a = \frac{2}{n^2 m} \left( \int_{-\pi/2}^{-\pi/4} F_s d\theta + \int_{-\pi/4}^{\pi/4} F_s d\theta - \int_{\pi/4}^{\pi/2} F_s d\theta \right) \quad (13)$$

Evaluating these integrals and assuming a solar reflectivity of 0.9, a $\Delta a$ of $1.61 \times 10^5$ meters is obtained. In order to relate this figure to an angular correction capability, assume that a satellite is at some reference altitude and it is desired to change its relative angular position. The rate at which the angular position would change with respect to a satellite remaining at the reference altitude is:

$$\frac{d\phi}{dN} = (n - n_r) P = 2\pi \left( \frac{1}{P} - \frac{1}{P_r} \right) = \frac{2\pi N \Delta P}{P_r} \quad (14)$$

where N is the number of orbits from the beginning of the maneuver, P is the orbital period of the satellite, the subscript r refers to the reference attitude, and $\Delta p$ is the period difference or change corresponding to the $\Delta a$ perturbation. The ratio of the period change to the reference period can be expressed as:

$$\frac{\Delta P}{P_r} = \frac{3}{2} \frac{\Delta a}{a_r} \quad (15)$$

Integrating equation (14) yields for the angular position change as a function of the number of orbits:

$$\theta = \frac{3\pi}{2} \frac{\Delta a}{a_r} N^2$$

For the situation being illustrated this represents a 102° change in 10 days time, and since in an actual correction maneuver the satellite would have to be returned to the reference altitude, a figure of 204° in twenty days is more representative of the actual capability of the system.

It is obvious that this is quite sufficient for maintaining angular position between planar reflector satellites, or in the synchronous case, maintaining position over a point on the earth.

Among the advantages offered by this system are that it requires no mass dispensing system in order to achieve orbit position control, thus eliminating the necessity of storing large supplies of propellant on board the satellite. It also uses the same attitude control system required to control the satellite during the reflective mode, thus imposing no further requirements on that system.

Figure 2:
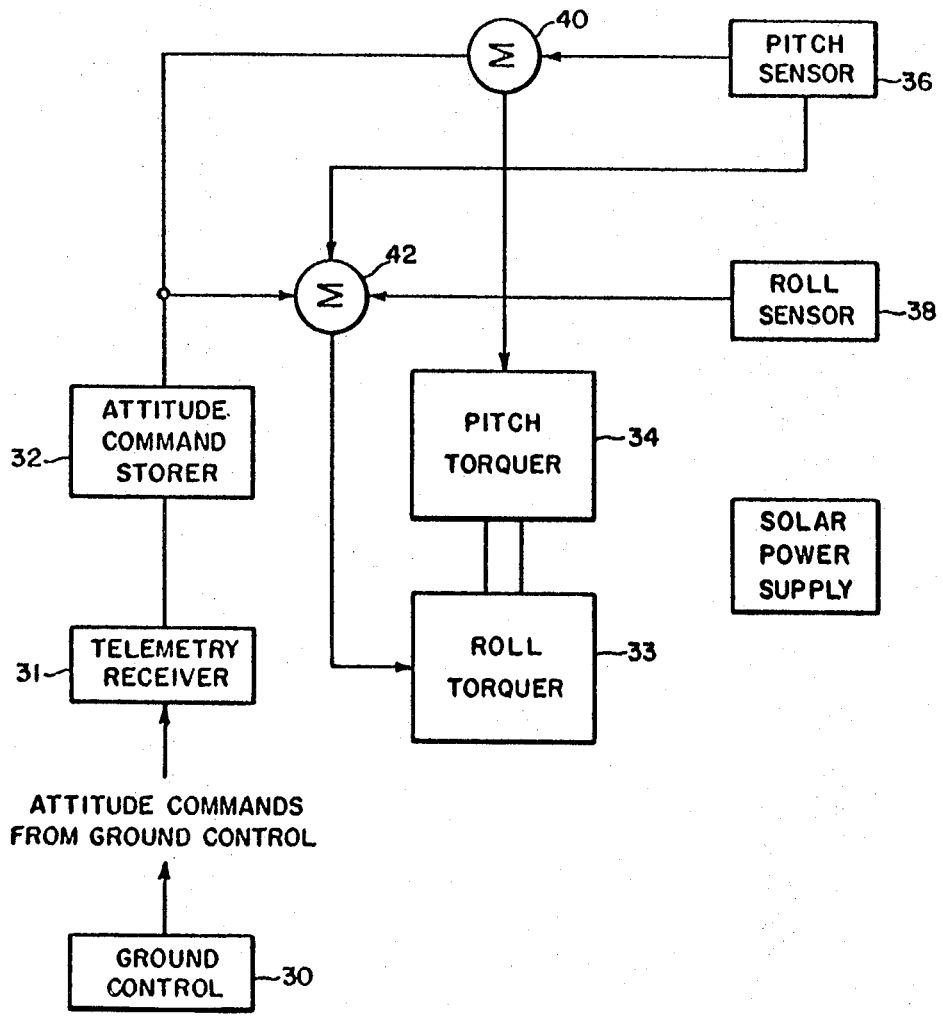
FIG. 2 is a block diagram of an exemplified attitude control system for a planar reflector satellite to be controlled in accord with the present invention.

An exemplification of a suitable attitude control system for the planar reflector satellite 10 is shown in FIG. 2 in block diagram form as relating to a similar satellite 20. The orbital elements of the reflector satellite will be known from ground-tracking stations and these elements will be forwarded to a central computation center for computation of the desired satellite attitude angles as a function of time. After computing the future direction of the sun line and velocity with respect to the satellite from the predicted orbital elements, the required future attitude sensor outputs as a function of time are then computed. These attitude angles as a function of some relatively short time period are transmitted to the satellite from a ground control 30 and stored in an attitude command storage means 32 to be used as reference inputs to the attitude control system as a function of time. This computation, transmission, storage, and use procedure would then be repeated at intervals throughout the useful life of the satellite.

The attitude control system aboard the satellite, in addition to the telemetry receiver 31 and attitude command storer 32, will comprise a roll torquer 33 for effecting change in satellite attitude with respect to roll, a pitch torquer 34 for effecting change in satellite attitude with respect to pitch, a pitch sensor 36, a roll sensor 38, and summers 40 and 42 to correlate information from the pitch and roll sensors with commands from the storer 32 to control operation of the torquers 33 and 34. Yaw, being defined as rotary movement about the axis perpendicular to the plane surface of the reflector 20, can be ignored, since such yaw will be without effect on aiming of such reflector in a selected direction.

We claim:

1. A method of controlling a planar reflector satellite orbiting the earth, said method comprising:

employing commandable pitch and roll attitude changing means in a reflective mode to aim such satellite for reflecting solar energy to a desired area on earth for portions of each orbit; and employing such commandable pitch and roll attitude changing means in an orbit position control mode during nonearth-aiming portions of each orbit for orientating said planar reflector relative to the sun to experience average-orbital-velocity-affecting solar pressure conditions.

2. The method of claim 1, wherein the aforesaid orientating obtains differences between the projected areas of such planar reflector experiencing solar pressure forces during orbital movement toward and away from the sun, respectively.

3. The method of claim 1, wherein:

the planar reflector satellite is in synchronous orbit about the earth; and the attitude changing means is operated in the reflective mode during the nighttime period of the area on the earth toward which the planar reflector is aimed during such mode, and is operated in the orbit position control mode during the day time period of such area.